United States Patent
Hernandez et al.

(10) Patent No.: US 9,303,876 B2
(45) Date of Patent: Apr. 5, 2016

(54) INJECTION SYSTEM FOR A TURBOMACHINE COMBUSTION CHAMBER, INCLUDING AIR INJECTION MEANS IMPROVING THE AIR-FUEL MIXTURE

(75) Inventors: Didier Hippolyte Hernandez, Quiers (FR); Thomas Olivier Marie Noel, Vincennes (FR); Matthieu Francois Rullaud, Champagne sur Seine (FR)

(73) Assignee: SNECMA, Paris (FR)

( * ) Notice: Subject to any disclaimer, the term of this patent is extended or adjusted under 35 U.S.C. 154(b) by 424 days.

(21) Appl. No.: 13/579,715

(22) PCT Filed: Feb. 24, 2011

(86) PCT No.: PCT/EP2011/052750
§ 371 (c)(1),
(2), (4) Date: Aug. 17, 2012

(87) PCT Pub. No.: WO2011/104304
PCT Pub. Date: Sep. 1, 2011

(65) Prior Publication Data
US 2012/0304650 A1 Dec. 6, 2012

(30) Foreign Application Priority Data
Feb. 26, 2010 (FR) ..................................... 10 51393

(51) Int. Cl.
*F23R 3/34* (2006.01)
*F23R 3/14* (2006.01)
(Continued)

(52) U.S. Cl.
CPC . *F23R 3/343* (2013.01); *F23R 3/14* (2013.01); *F23D 2900/00015* (2013.01); *F23D 2900/11101* (2013.01); *F23R 3/04* (2013.01); *F23R 3/286* (2013.01); *Y02T 50/675* (2013.01)

(58) Field of Classification Search
CPC ............ F23D 2900/00015; F23D 2900/11101; F23D 11/101; F23R 3/14; F23R 3/343; F23R 3/04; F23R 3/10; F23R 3/286; F02C 1/00

USPC .................... 60/734, 737, 740, 742, 746, 748
See application file for complete search history.

(56) References Cited

U.S. PATENT DOCUMENTS

| 4,845,940 | A | * | 7/1989 | Beer | ...................... F23C 6/045 60/732 |
| 5,044,559 | A | * | 9/1991 | Russell et al. | ........ F23D 11/107 239/406 |

(Continued)

FOREIGN PATENT DOCUMENTS

| EP | 1 806 535 A1 | 7/2007 |
| EP | 2 093 489 A2 | 8/2009 |

(Continued)

OTHER PUBLICATIONS

International Search Report issued Oct. 5, 2011 in Application No. PCT/EP2011/052750.

*Primary Examiner* — Phutthiwat Wongwian
*Assistant Examiner* — Alain Chau
(74) *Attorney, Agent, or Firm* — Oblon, McClelland, Maier & Neustadt, L.L.P.

(57) ABSTRACT

An air and fuel injection system for the back of a turbomachine's annular combustion chamber, including a central injector and a peripheral annular fuel injector including at least one fuel injection aperture made in an annular wall and emerging in a peripheral annular channel separated from a central channel by the annular wall and having an annular space of admission of air. The system also includes multiple air ejection apertures made in the annular wall downstream from the fuel ejection aperture or apertures in reference to the flow of the air stream, for an additional injection of air into the channel.

10 Claims, 5 Drawing Sheets

(51) Int. Cl.
*F23R 3/28* (2006.01)
*F23R 3/04* (2006.01)

(56) References Cited

U.S. PATENT DOCUMENTS

| | | | |
|---|---|---|---|
| 5,165,241 A | 11/1992 | Joshi et al. | |
| 5,647,538 A * | 7/1997 | Richardson | F23D 11/101 239/405 |
| 5,737,921 A * | 4/1998 | Jones et al. | 60/740 |
| 6,272,840 B1 * | 8/2001 | Crocker et al. | F02C 7/22 239/404 |
| 6,367,262 B1 * | 4/2002 | Mongia et al. | F23R 3/14 60/748 |
| 6,381,964 B1 * | 5/2002 | Pritchard et al. | 60/746 |
| 6,389,815 B1 * | 5/2002 | Hura et al. | 60/746 |
| 2005/0130089 A1 | 6/2005 | Oda et al. | |
| 2007/0169486 A1 | 7/2007 | Hernandez et al. | |
| 2008/0236165 A1 * | 10/2008 | Baudoin et al. | 60/746 |
| 2009/0212139 A1 | 8/2009 | Thomson et al. | |
| 2009/0255120 A1 | 10/2009 | McMasters et al. | |
| 2010/0251719 A1 | 10/2010 | Mancini et al. | |
| 2010/0308135 A1 * | 12/2010 | Yamamoto et al. | F23R 3/343 239/402 |
| 2011/0089262 A1 | 4/2011 | Thomson et al. | |
| 2011/0089264 A1 | 4/2011 | Thomson et al. | |

FOREIGN PATENT DOCUMENTS

| | | | |
|---|---|---|---|
| EP | 2093489 A2 * | 8/2009 | F23R 3/28 |
| GB | 2 456 753 A | 7/2009 | |
| WO | WO 2009/126485 A2 | 10/2009 | |
| WO | WO 2009/126534 A1 | 10/2009 | |

* cited by examiner

INJECTION SYSTEM FOR A TURBOMACHINE COMBUSTION CHAMBER, INCLUDING AIR INJECTION MEANS IMPROVING THE AIR-FUEL MIXTURE

TECHNICAL FIELD

The present invention relates to the field of turbomachine combustion chambers, in particular in aircraft turbomachines, and more specifically concerns systems for injection of air and fuel into these combustion chambers.

More specifically the invention concerns injection systems with a twin fuel injection circuit, which include a central injector, commonly called a pilot injector, delivering a permanent rate of flow of fuel optimised for low speeds, together with a peripheral annular injector, sometimes called the main injector, which delivers an intermittent rate of flow of fuel optimised for high speeds, where this peripheral injector is, for example, of the type commonly called a multipoint injector.

These injection systems have been developed to enable combustion chambers to operate with a blend of air and fuel in which there is a low proportion of fuel, and more generally for improved adaptation of the injection of air and of fuel at the various operating speeds of the combustion chambers, in order to reduce their fuel consumption and their emission of pollutants such as nitrogen oxides and smoke.

STATE OF THE PRIOR ART

As is illustrated by FIG. 1, an annular combustion chamber 10 in a turbomachine habitually includes two annular walls, respectively an internal wall 12 and an external wall 14, which delimit the combustion chamber and which are connected upstream to a back annular end wall 16 of the combustion chamber, and downstream respectively to an external casing of the turbomachine and to an internal shell 20 connected to a diffuser 22 positioned upstream from the combustion chamber and intended to diffuse into this chamber compressed air from a compressor of the turbomachine (not shown in FIG. 1), in a known manner.

The back annular end wall 16 generally includes apertures which are regularly distributed around the axis of the chamber, and in which air-fuel injection systems 24 are installed, each of which is intended to produce a flame in the combustion chamber.

A combustion chamber 10 is habitually divided into an upstream zone 10a, called the primary zone, dedicated to the combustion of flames originating from the injection systems 24 in back annular end wall 16 of the combustion chamber, and of a downstream zone 10b, called the dilution zone, which is dedicated to cooling and diluting the combustion gases in the cool air flowing from apertures made in annular walls 12 and 14 delimiting the combustion chamber.

Injection systems 24 of combustion chamber 10 represented in FIG. 1 are of the type including a central injector, also called a pilot injector, and a peripheral annular injector, also called a main injector, where the latter is in this case of the multipoint type.

As is shown by FIG. 2, which is a view on a larger scale of injection system 24 represented in FIG. 1, central fuel injector 26 is formed from a nozzle emerging along a central axis 28 of the system, which essentially constitutes an axis of symmetry for the revolving parts constituting injection system 24.

This central injector 26 is habitually associated with two air inlet channels, one of which is an internal channel 29 into which central injector 26 emerges, such that the fuel sprayed by this injector is immediately able to be blended with the air admitted into this channel, and an outer annular channel 30, which emerges downstream in the injection system in order to allow subsequent enrichment of the air-fuel blend with air.

Both the abovementioned air inlet channels 29 and 30 are generally traversed by oblique fins 32 and 34 intended to give the air stream traversing them a swirling motion around the central axis of injection system 24 in order to improve homogenisation of the air-fuel blend in the injection system.

Both these abovementioned air inlet channels 29 and 30 are commonly called swirlers, and are generally externally delimited by an annular wall 36, or respectively 38, with a convergent-divergent internal profile, sometimes called a venturi, and intended to guide a proportion of the fuel sprayed by central injector 26 downstream by the venturi effect, and to spray this fuel in the area of a lip 37, or respectively 39, formed at the downstream end of said wall, in a well-known manner.

In the example represented in FIG. 2, both air inlet channels 29 and 30, and also annular walls 36 and 38 delimiting them, extend essentially along axis 28 of the injection system.

Central fuel injector 26 is habitually fed by a tube 40 partially housed in an arm 42 supported by external casing 18 of the combustion chamber (FIG. 1).

In addition, peripheral or multipoint fuel injector 43 is formed from an annular row of fuel ejection apertures 44 which are, for example, installed in a tapered upstream portion 46 of wall 38 delimiting external annular channel 30 (FIG. 2).

Fuel ejection apertures 44 of peripheral injector 43 adjoin an annular distribution cavity 48, fed with fuel by a duct 50 partially housed in arm 42, and these fuel ejection apertures 44 emerge in a peripheral annular channel 52 having an annular space of admission of a stream of air intended to be blended in said channel 52 with fuel delivered by said peripheral injector 43.

Abovementioned annular air admission space 53 is traversed by oblique fins 54 intended to give the stream of air traversing them a swirling motion around the central axis of injection system 24.

Peripheral annular channel 52 is delimited internally by annular wall 38 and externally by a bowl which is flared at its downstream end, and which supports means 58 allowing injection system 24 to be assembled in back end wall 26 of the combustion chamber.

In the example represented in FIGS. 1 and 2, annular air admission space 53 has a tapered shape and is delimited internally by tapered portion 46 of annular wall 38 so as to have an opening which is oriented radially towards the exterior.

In operation the fuel penetrates into peripheral annular channel 52 through fuel ejection apertures 44 of peripheral injector 43, and this fuel then encounters the stream of air which is flowing in channel 52, which improves atomisation of this fuel, i.e. spraying of this fuel in the form of fine droplets.

Generally, in injection systems having two fuel injection circuits such as, for example, injection system 24 described above, central or pilot injector 26 delivers a rate of flow of fuel which is essentially permanent at all operating speeds of the combustion chamber, and which is optimised for low speeds, whereas peripheral or main injector 43 delivers at high speed a high fuel rate of flow, which is optimised for this type of speed, and delivers no fuel at low speeds.

However, combustion chambers equipped with injection systems of the type described above have relatively high levels of emission of certain pollutants, such as carbon monoxide and hydrocarbons, and this is particularly so at intermediate speeds, notably at the speed known as the "approach" speed, when the developed thrust is equal to approximately 30% of maximum thrust.

Levels of emission of pollutants depend on the quality of the combustion of the fuel in these combustion chambers, and therefore notably on the quality of atomisation of the fuel from the peripheral injectors in the injection systems, and also on the evaporation of these fuel droplets.

However, fuel atomisation and evaporation prove to be less efficient at intermediate operating speeds, notably due to the fact that the pressure of ejection of the fuel by the peripheral injectors is lower at these speeds.

For the same reason, as illustrated in FIG. 3, a proportion of the fuel from the peripheral injectors is likely to drip when emerging from these injectors in the form of a layer of liquid, or in the form of liquid trickles 60 in the particular case of injectors of the multipoint type.

Generally, improvement of atomisation and of evaporation of the fuel from the peripheral injectors in the injection systems with twin fuel injection circuits proves desirable at all operating speeds in order to reduce further the levels of emission of substances harmful for the environment, such as nitrogen oxides, carbon monoxide and hydrocarbons.

DESCRIPTION OF THE INVENTION

One aim of the invention is notably to provide a simple, economic and efficient solution to at least some of these problems, allowing the abovementioned disadvantages to be avoided.

To this end the invention proposes an air and fuel injection system for the back of a turbomachine's annular chamber, including at least two coaxial fuel injection devices, including a central injector emerging in a central channel designed for the admission of a stream of air intended to be blended in said injection system with fuel from said central injector, together with a peripheral annular injector including at least one fuel ejection aperture made in an annular wall and emerging in a peripheral annular channel separated from said central channel by said annular wall, and having an annular space of admission of a stream of air intended to be blended in this peripheral channel with fuel delivered by the peripheral injector.

According to the invention, the injection system also includes a plurality of air ejection apertures traversing the abovementioned annular wall downstream from said at least one fuel ejection aperture in reference to the flow of said air stream, for additional injection of air from said central channel into the abovementioned peripheral channel.

Upstream and downstream are here defined along the flow of the air stream in the peripheral annular channel.

The additional injection of air in the flow of air admitted into the peripheral annular channel, downstream from the injection of fuel by the peripheral injector, enables the quality of atomisation of the fuel to be substantially improved, and by this means also improves the evaporation of the droplets of this fuel.

The air ejection apertures can take air directly from the air stream in the central channel, and can do so particularly efficiently since the air flowing in this central channel has been subject, when admitted into this channel, to a load loss less than that to which the air admitted into the peripheral annular channel is subject.

This configuration has the additional advantage that it is particularly simple and compact in the radial direction.

Each one of the air ejection apertures can have an ejection axis which is roughly perpendicular to a plane tangential to the abovementioned annular wall in the area of said aperture, and therefore also perpendicular to the local direction of flow of the air stream at the outlet of the aperture.

As a variant, each aperture can have an ejection axis which is inclined in an axial plane and/or in a plane which is transverse relative to a direction perpendicular to the plane tangential to the abovementioned annual wall in the area of said aperture.

The peripheral injector can have a single annular fuel ejection aperture which is designed to deliver fuel in the form of an annular layer.

As a variant, in a preferred embodiment of the invention, the peripheral injector includes multiple fuel ejection apertures housed in the abovementioned annular wall, and emerging in the peripheral annular channel.

In this case, each of said air ejection apertures preferably emerges over the predetermined path of a fuel trickle which may, in operation, drip on the abovementioned annular wall from a corresponding fuel ejection aperture.

The path followed by the liquid fuel which may drip from each of the fuel ejection apertures depends on the geometry of the injection system, and in particular on the geometry of the above-mentioned annular wall, and on the geometry of the flow of the air stream along this wall, such that this path can easily be determined by experimental methods, or by digital simulations.

The injection of air on the respective paths of the fuel trickles, coming from at least a proportion of the fuel ejection apertures, enables separation of this fuel, and its blending with the air stream, to be improved.

The number of fuel ejection apertures of the peripheral injector is preferentially equal to the number of air ejection apertures, such that there is one air ejection aperture for each fuel ejection aperture.

In a known manner, the injection system advantageously includes oblique fins, which traverse the annular admission space of said air stream, giving this air stream a swirling motion, the orientation of which determines the path of the abovementioned fuel trickles.

Indeed, the orientation of the fins determines the geometry of the flow of the air stream in the peripheral annular channel, notably along the abovementioned annular wall.

The annular space of admission of said air stream is preferably tapered, such that the diameter of the average transverse section of this space reduces from upstream to downstream in reference to the flow of the air stream.

Thus, this annular space has an opening oriented radially towards the exterior, which can facilitate ejection of air into the peripheral annular channel by increasing the load loss to which the air stream in this annular admission space is subject, as will be shown more clearly below.

In the preferred embodiment of the invention, the abovementioned central channel is an external annular channel, which is constructed around an annular wall separating it from an internal channel, into which the central injector emerges, said annular combustion chamber being traversed by oblique fins intended to give the stream of air admitted into this channel a swirling motion, in a known manner.

In this preferred embodiment of the invention said annular wall, which separates the external annular channel and the internal channel, has on its internal face a convergent-divergent profile intended for aspiration by a venturi effect of a film of fuel from the central injector, and said annular wall has at its downstream end an annular lip intended for spraying the abovementioned fuel film under the effect of a flow of the stream of air admitted into the external annular channel, in a known manner.

The invention also concerns an annular combustion chamber for a turbomachine including at least one injection system of the type described above.

The invention also concerns a turbomachine including an annular combustion chamber of the type described above.

BRIEF DESCRIPTION OF THE ILLUSTRATIONS

The invention will be better understood, and other details, advantages and characteristics of it will appear, on reading the following description given as a non-restrictive example, and with reference to the appended illustrations, in which:

FIG. 1, which was previously described, is a schematic axial section half-view of a turbomachine's annular combustion chamber including injection systems of a known type;

FIGS. 2 and 3, which were previously described, are axial-section schematic views on a larger scale illustrating an injection system of the combustion chamber of FIG. 1;

In all these figures, identical references designate identical or comparable elements.

DETAILED DESCRIPTION OF PREFERRED EMBODIMENTS

Figure 4:
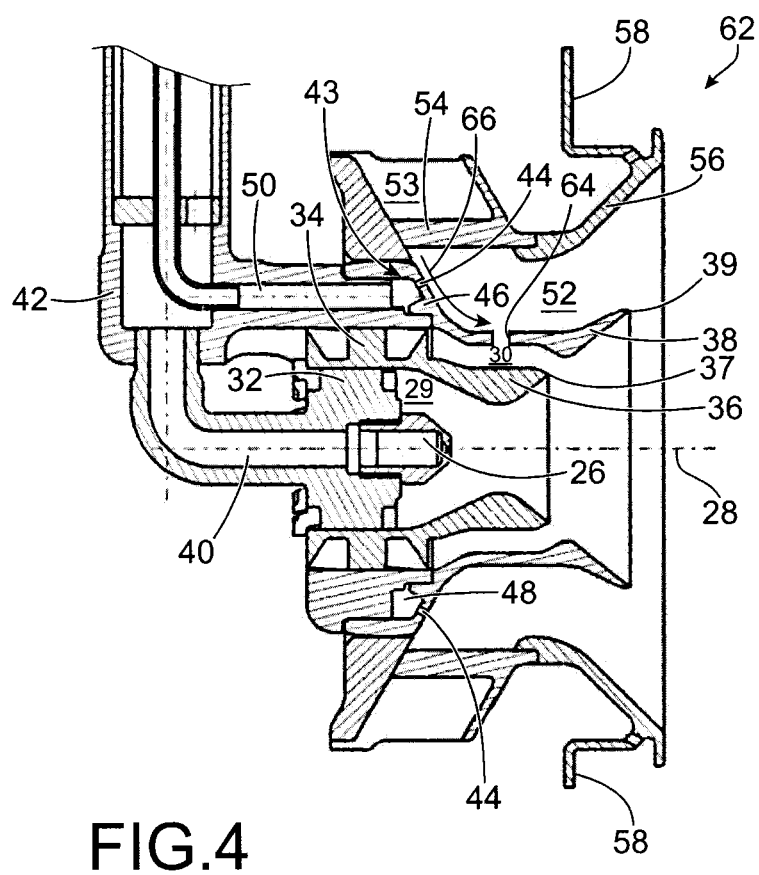
FIG. 4 is a partial schematic axial section half-view of an injection system for a turbomachine's annular combustion chamber according to a first preferred embodiment of the invention.

FIG. 4 represents an injection system 62 in accordance with a preferred embodiment of the present invention, and intended to equip an annular combustion chamber in a turbomachine.

This injection system 62 is of a type similar to previously described injection system 24, but differs from the latter in that it includes a plurality of air ejection apertures 64 made in annular wall 38, which are regularly distributed around axis 28 of this injection system 62.

Each air ejection aperture 64 adjoins external annular channel 30 associated with central injector 26, and emerges in peripheral annular channel downstream from fuel ejection apertures 44 of peripheral injector 43, where the downstream direction is here determined in reference to local direction 66 of the air flow along annular wall 38 in peripheral annular channel 52.

Figure 5:
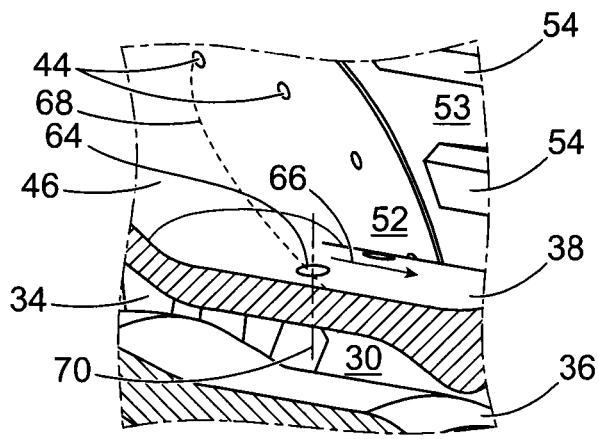
FIG. 5 is a partial schematic perspective view, on a larger scale, of the injection system of FIG. 4, more specifically illustrating an air ejection aperture of this injection system.

As is shown in FIG. 5, each air ejection aperture 64 is made along path 68 of a trickle of liquid which may drip, in operation, from a corresponding fuel injection aperture 44.

In addition, each air ejection aperture 64 has an ejection axis 70 which is roughly perpendicular to the plane tangential to annular wall 38 in the area of this aperture, and therefore to local direction 66 of the air flow along this wall.

Figure 1:
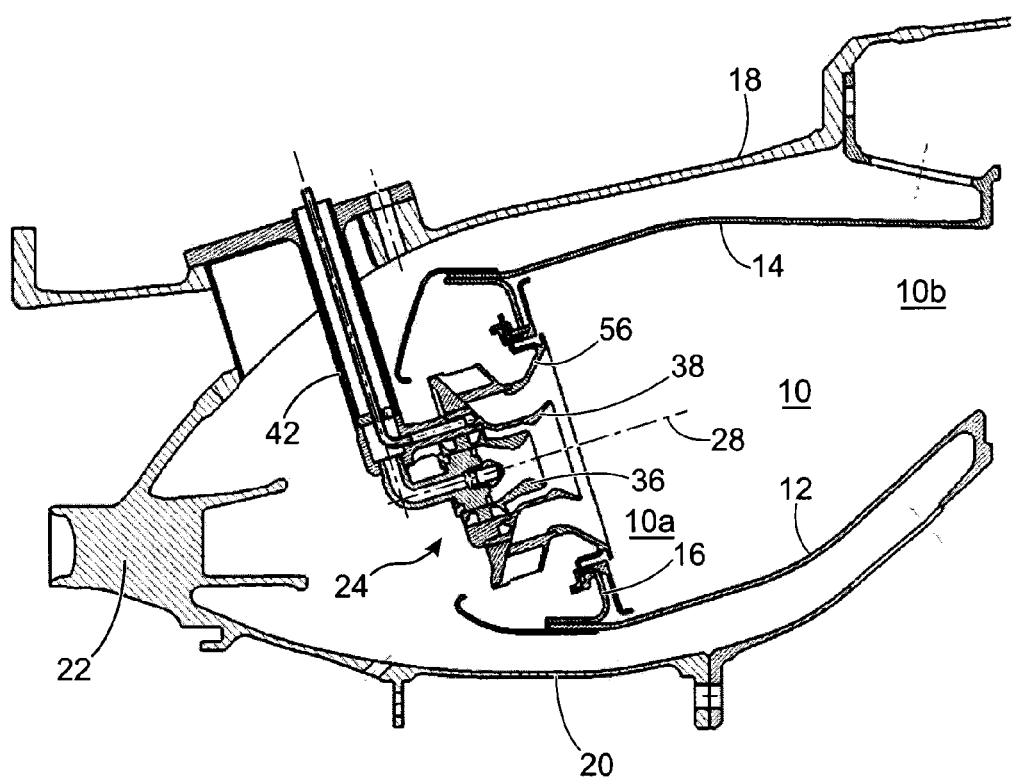
Figure 2:
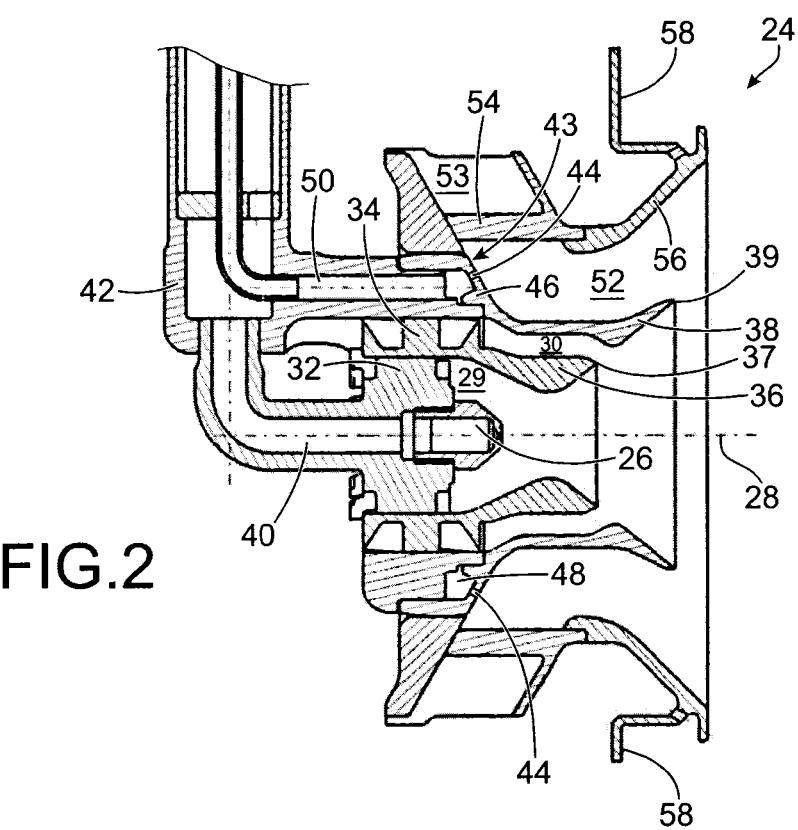
Figure 3:
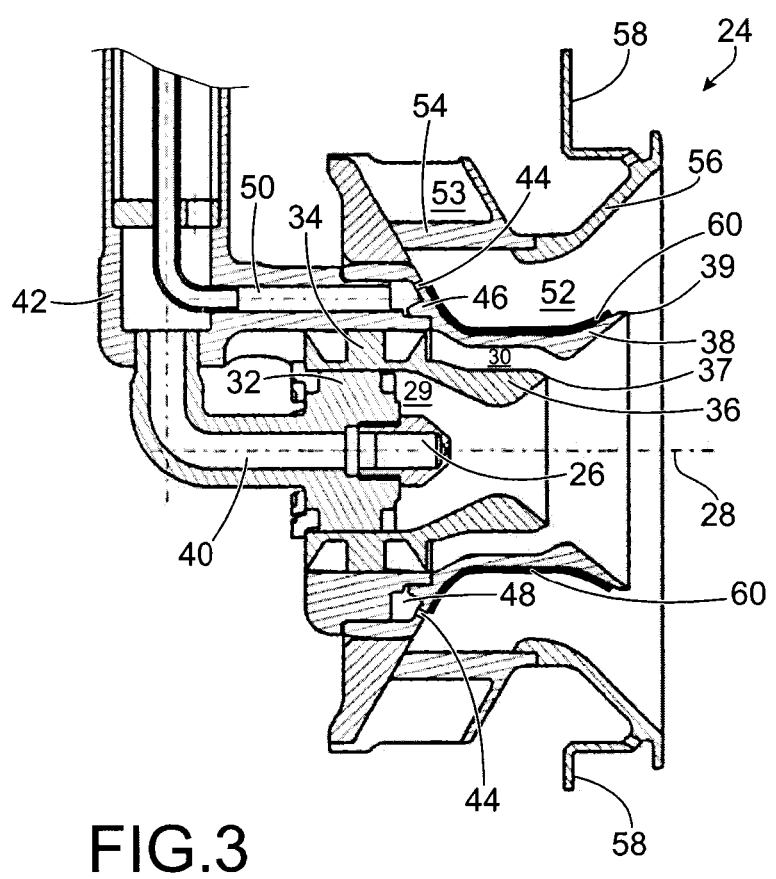

In operation, in a turbomachine including a combustion chamber equipped with injection systems 62 of the type described above, the portion of air from diffuser 22 (FIG. 1) which penetrates into annular admission space 53 of peripheral annular channel 52 is subject to a relatively high load loss, given that the opening of this admission space 53 is oriented radially outwards, whereas the proportion of this air which penetrates into external annular channel 30 associated with central injector 26 is subject to a relatively low load loss.

The air flowing into external annular channel 30 associated with central injector 26 therefore tends to flow in air ejection apertures 64, and to penetrate into peripheral annular channel 52.

The additional ejection of air obtained in this manner tends to separate any trickles of liquid fuel emerging from fuel ejection apertures 44 and dripping on annular wall 38.

This additional injection of air also enables the atomisation of the fuel in suspension in the air stream flowing in the peripheral annular channel to be improved, and also enables the evaporation of the droplets of this fuel to be improved, as explained above.

Figure 6:
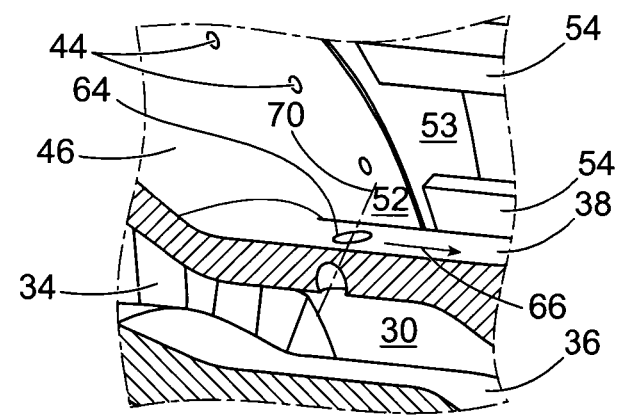
FIGS. 6 and 7 are views similar to FIG. 5 and illustrate other possible conformations of air ejection apertures in an injection system in accordance with the preferred embodiment of the invention.
Figure 7:
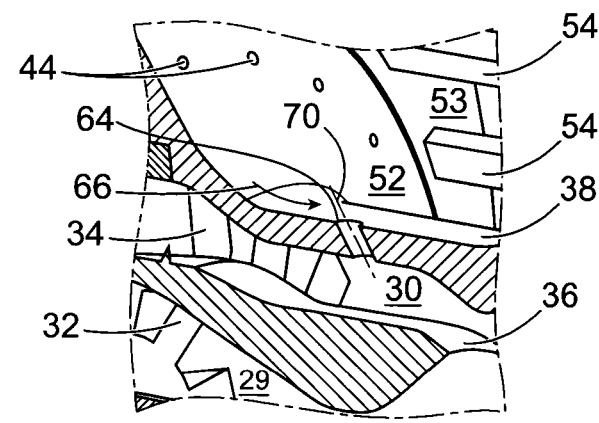

As a variant, each air ejection aperture 64 can have an ejection axis 70 which is inclined relative to the direction perpendicular to the plane tangential to annular wall 38 in the area of this aperture, i.e. inclined relative to the direction of axis 70 of FIG. 5, where this inclination can, for example, be defined in a transverse plane as in FIG. 6 and/or in an axial plane as in FIG. 7, when this enables the efficiency of the additional injection of air to be improved.

The invention claimed is:

1. An air and fuel injection system for the back end wall of a turbomachine's annular combustion chamber, comprising:
at least two coaxial fuel injecting devices, said two coaxial fuel injecting devices including a central injector and a peripheral annular injector, the central injector emerging in a first channel designed for admission of a first air stream and having an aft outlet opened in a downstream direction for ejecting said first air stream so that said first air stream will mix in said injection system with fuel from said central injector, the peripheral annular injector including at least one fuel ejection aperture made in a first annular wall and emerging in a peripheral annular channel separated from said first channel by said first annular wall, said first annular wall externally delimiting said aft outlet of the first channel, and said peripheral annular channel having an annular space of admission of a second air stream intended to be blended in said peripheral annular channel with fuel delivered by said peripheral injector; and
multiple air ejection apertures traversing said first annular wall so as to open in said first channel and in said peripheral annular channel downstream from said at least one fuel ejection aperture in reference to the flow of the second air stream for an additional injection of air from said first channel into said peripheral annular channel,
wherein said first channel includes an external annular channel and an internal channel, where said external annular channel is installed around a second a annular wall separating the external annular channel from said internal channel, and wherein said central injector emerges into said internal channel, and
wherein said second annular wall has on its internal face a convergent-divergent profile intended for aspiration by a venturi effect of a film of fuel from said central injector, and the second annular wall has at its downstream end an annular lip intended for spraying said fuel film under the effect of a flow of a part of the first air stream admitted into the external annular channel.

2. The injection system according to claim 1, wherein said annular space of admission of said second air stream is tapered in shape, such that a diameter of an average transverse section of said annular space reduces from upstream to downstream in reference to the flow of the second air stream.

3. The injection system according to claim 1, wherein said external annular channel is traversed by oblique tins intended to give a part of the first air stream admitted into the external annular channel a swirling motion.

4. The injection system according to claim 1, wherein an ejection axis of each of the air ejection apertures is substantially perpendicular to a plane tangential to the first annular wall in an area of each respective air ejection aperture.

5. The injection system according to claim 1, wherein an ejection axis of each of the air ejection apertures is inclined relative in a transverse plane perpendicular to a plane tangential to the first annular watt in an area of each respective air ejection aperture.

6. The injection system according to claim 1, wherein an ejection axis of each of the air ejection apertures is inclined relative in an axial plane perpendicular to a plane tangential to the first annular wall in an area of each respective air ejection aperture.

7. The injection system according to claim 1, wherein said peripheral annular injector includes a plurality of fuel ejection apertures provided in said first annular wall and emerging in said peripheral annular channel, and wherein each of said air ejection apertures emerges on a predetermined path of a fuel trickle which may, in operation, drip on said first annular wall from a corresponding fuel ejection aperture of said plurality of fuel ejection apertures.

8. The injection system according to claim 7, further comprising:

oblique fins, which traverse said annular space of admission of said second air stream giving the second air stream a swirling motion, the orientation of said oblique fins determining the path of said fuel trickles.

9. An annular combustion chamber for a turbomachine, comprising:

at least one injection system according to claim 1.

10. A turbomachine, comprising:

an annular combustion chamber according to claim 9.

* * * * *